US012571941B2

(12) United States Patent
Takahashi

(10) Patent No.: US 12,571,941 B2
(45) Date of Patent: Mar. 10, 2026

(54) PLASTIC OPTICAL PRODUCT AND PLASTIC SPECTACLE LENS

(71) Applicant: TOKAI OPTICAL CO. LTD., Okazaki (JP)

(72) Inventor: Hirotoshi Takahashi, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 376 days.

(21) Appl. No.: 18/299,804

(22) Filed: Apr. 13, 2023

(65) Prior Publication Data

US 2023/0258843 A1 Aug. 17, 2023

Related U.S. Application Data

(63) Continuation of application No. PCT/JP2021/037055, filed on Oct. 6, 2021.

(30) Foreign Application Priority Data

Oct. 23, 2020 (JP) ................................. 2020-178343

(51) Int. Cl.
$G02B$ *1/11* (2015.01)
$G02B$ *1/00* (2006.01)
(Continued)

(52) U.S. Cl.
CPC .................. $G02B$ *1/11* (2013.01); $G02B$ *1/00* (2013.01); $G02B$ *1/02* (2013.01); $G02B$ *1/04* (2013.01);
(Continued)

(58) Field of Classification Search
CPC ... G02B 1/00; G02B 1/02; G02B 1/04; G02B 1/041; G02B 1/11; G02B 1/111;
(Continued)

(56) References Cited

U.S. PATENT DOCUMENTS 6,635,352 B2 10/2003 Shirakawa
8,189,261 B2 5/2012 Tomoda
(Continued)

FOREIGN PATENT DOCUMENTS

EP 2 199 835 A1 6/2010
EP 2 816 379 A1 12/2014
(Continued)

OTHER PUBLICATIONS

International Search Report and Written Opinion (Application No. PCT/JP2021/037055) dated Dec. 28, 2021.
(Continued)

*Primary Examiner* — Jason M Mandeville
(74) *Attorney, Agent, or Firm* — BURR PATENT LAW, PLLC

(57) ABSTRACT

A plastic optical product 1 includes optical multilayer films 6 formed via intermediate films 4 on both surfaces of a plastic base 2. In each optical multilayer film 6, $SiO_2$ layers 10 made of $SiO_2$ and $ZrO_2$ layers 12 made of $ZrO_2$ alternate such that a total number of the $SiO_2$ layers 10 and the $ZrO_2$ layers 12 is eight and a layer closest to the base 2 is the $ZrO_2$ layer. The optical multilayer film 6 has a physical film thickness of not less than 480 nm and not greater than 530 nm. A total of physical film thicknesses of all the $SiO_2$ layers 10 is not less than 350 nm and not greater than 440 nm. The $ZrO_2$ layer 12 that is a first layer L1 closest to the base 2 has a physical film thickness of not less than 5 nm and not greater than 12 nm.

7 Claims, 6 Drawing Sheets

(51) Int. Cl.

| | | |
|---|---|---|
| *G02B 1/02* | (2006.01) | |
| *G02B 1/04* | (2006.01) | |
| *G02B 1/111* | (2015.01) | |
| *G02B 1/113* | (2015.01) | |
| *G02B 1/115* | (2015.01) | |
| *G02B 1/18* | (2015.01) | |
| *G02C 7/02* | (2006.01) | |
| *G02C 7/10* | (2006.01) | |
| *G02B 1/14* | (2015.01) | |

(52) U.S. Cl.
CPC .............. *G02B 1/041* (2013.01); *G02B 1/111* (2013.01); *G02B 1/113* (2013.01); *G02B 1/115* (2013.01); *G02B 1/18* (2015.01); *G02C 7/02* (2013.01); *G02C 7/10* (2013.01); *G02B 1/14* (2015.01)

(58) Field of Classification Search
CPC .......... G02B 1/113; G02B 1/115; G02B 1/14; G02B 1/18; G02C 7/02; G02C 7/10
USPC ............................................. 351/159, 159.01
See application file for complete search history.

(56) References Cited

U.S. PATENT DOCUMENTS

| | | | | |
|---|---|---|---|---|
| 9,057,887 | B1* | 6/2015 | Jaglan .................... | G02C 7/104 |
| 9,651,713 | B2* | 5/2017 | Takahashi ............... | G02C 7/10 |
| 2003/0218798 | A1* | 11/2003 | Kanazawa ............. | G02B 1/115 |
| | | | | 359/359 |
| 2007/0159697 | A1* | 7/2007 | Terayama .......... | G02B 27/0012 |
| | | | | 359/586 |
| 2010/0225882 | A1* | 9/2010 | Nishimoto ............. | G02B 1/115 |
| | | | | 359/359 |
| 2010/0238557 | A1* | 9/2010 | Tomoda .................. | G02B 1/111 |
| | | | | 156/60 |
| 2015/0192701 | A1* | 7/2015 | Takahashi .............. | G02B 1/115 |
| | | | | 351/159.62 |
| 2019/0219841 | A1 | 7/2019 | Adachi et al. | |
| 2023/0072027 | A1* | 3/2023 | Ishimura ............... | G02B 1/113 |
| 2023/0244003 | A1* | 8/2023 | Takahashi ............... | G02B 1/14 |
| | | | | 359/586 |

FOREIGN PATENT DOCUMENTS

| | | | |
|---|---|---|---|
| EP | 3 633 417 A1 | 4/2020 | |
| JP | 2003-313496 A | 11/2003 | |
| JP | 5248516 B2 | 7/2013 | |
| JP | 2020-067518 A | 4/2020 | |
| WO | 2009/041580 A1 | 4/2009 | |
| WO | 2019/103105 A1 | 5/2019 | |
| WO | 2020/104391 | 5/2020 | |

OTHER PUBLICATIONS

Extended European Search Report dated Sep. 9, 2024 (Application No. 21882601.4).

* cited by examiner

PLASTIC OPTICAL PRODUCT AND PLASTIC SPECTACLE LENS

CROSS REFERENCE TO RELATED APPLICATION

This application is a Continuation of International Application No. PCT/JP2021/037055, filed on Oct. 6, 2021, which claims the benefit of Japanese Patent Application Number 2020-178343 filed on Oct. 23, 2020, the disclosures of which are incorporated by reference herein in their entireties.

FIELD OF THE INVENTION

The present invention relates to a plastic optical product that is an optical product having a plastic base, and a plastic spectacle lens.

BACKGROUND OF THE INVENTION

The plastic optical component disclosed in Japanese Patent No. 5248516 has been known as a plastic optical component.

In this optical component, an optical multilayer film as an antireflection film is formed on a surface of a base. The optical multilayer film is formed by stacking eight layers in total such that low refractive index layers and high refractive index layers alternate, and the first layer closest to the base is the high refractive index layer. The optical multilayer film is formed so as to exhibit a W-shaped spectral distribution of reflectance with a local maximum point of the center peak around a wavelength of 520 nm, from the viewpoint of assuring processing stability and generally acceptable outer appearance. In a case where a plastic lens having such an antireflection film formed therein is viewed from an incident side, pale-green reflected light, namely, green-based reflection color is observed.

At the plastic lens, the reflected light is green.

Green is the brightest color among colors perceived with a human eye. In other words, green is located near the local maximum point, when the wavelength is 555 nm, of a spectral luminous efficiency curve representing a ratio of an intensity with which a human eye perceives brightness for each wavelength of light, relative to the maximum sensitivity.

Accordingly, the reflected light from the plastic lens is conspicuous due to its green color although the reflectance is very low and the green is pale-green. In other words, the luminous reflectance at the plastic lens is relatively high in a case where the relative luminous efficiency is taken into consideration.

Particularly, in a case where the plastic lens is used as a spectacle lens, reflected light from a wearer is relatively conspicuous to another person.

A main object of the present invention is to provide a plastic optical product and a plastic spectacle lens that allow reflected light to be more inconspicuous.

SUMMARY OF THE INVENTION

In order to attain the aforementioned object, the invention as in a first aspect is directed to a plastic optical product including an optical multilayer film formed directly or via an intermediate film on at least one surface of a plastic base. In the optical multilayer film, $SiO_2$ layers made of $SiO_2$ and $ZrO_2$ layers made of $ZrO_2$ alternate such that a total number of the $SiO_2$ layers and the $ZrO_2$ layers is eight and a layer closest to the base is the $ZrO_2$ layer. The optical multilayer film has a physical film thickness of not less than 480 nm and not greater than 530 nm. A total of physical film thicknesses of all the $SiO_2$ layers is not less than 350 nm and not greater than 440 nm. The $ZrO_2$ layer that is a layer closest to the base has a physical film thickness of not less than 5 nm and not greater than 12 nm.

According to the invention as in a second aspect, in the above-described invention, the $ZrO_2$ layer disposed at a third layer counting from the base has a physical film thickness of not less than 11 nm and not greater than 20 nm.

According to the invention as in a third aspect, in the above-described invention, the $SiO_2$ layer disposed at a fourth layer counting from the base has a physical film thickness of not less than 200 nm and not greater than 245 nm.

According to the invention as in a fourth aspect, in the above-described invention, a total of physical film thicknesses of the $ZrO_2$ layer that is the layer closest to the base, to the $SiO_2$ layer disposed at the fourth layer counting from the base, is not less than 270 nm and not greater than 330 nm.

According to the invention as in a fifth aspect, in the above-described invention, the intermediate film is a hard coating film.

According to the invention as in a sixth aspect, in the above-described invention, luminous reflectance at a surface at which the optical multilayer film is formed is not greater than 0.8%.

According to the invention as in a seventh aspect, in the above-described invention, reflected light at a surface at which the optical multilayer film is formed has a white color or a bluish white color.

In order to attain the aforementioned object, the invention as in an eighth aspect is directed to a plastic spectacle lens including the plastic optical product according to the above-described invention.

A main effect of the present invention is to provide a plastic optical product and a plastic spectacle lens that allow reflected light to be more inconspicuous.

DETAILED DESCRIPTION OF THE INVENTION

An exemplary embodiment of the present invention will be described below.

The present invention is not limited to the following embodiment.

Figure 1:
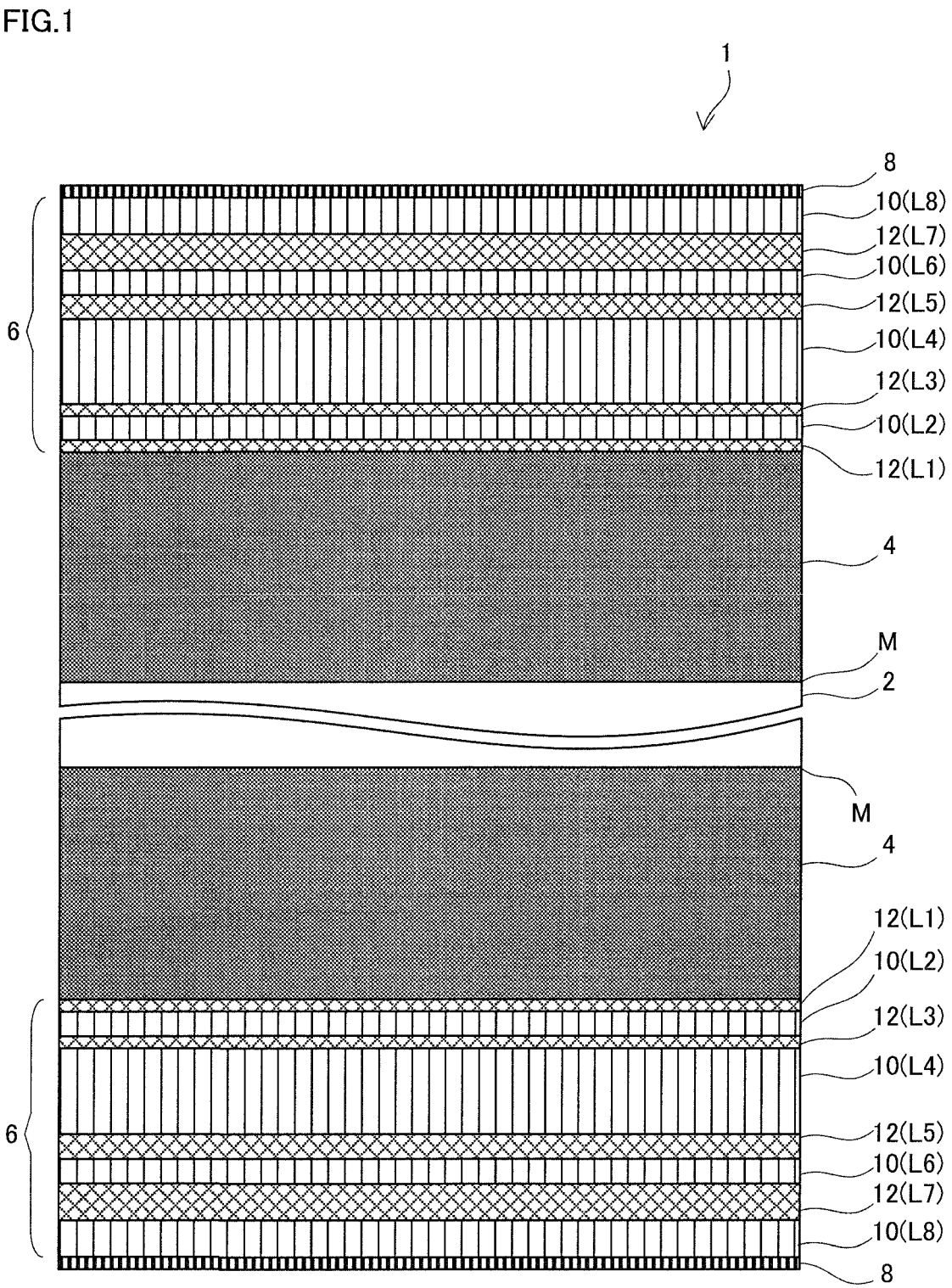
FIG. 1 is a schematic cross-sectional view of a plastic optical product according to the present invention.

As shown in FIG. 1, a plastic optical product 1 according to the present invention has a plate-shaped base 2, optical multilayer films 6 formed on both surfaces, namely, each film-formation surface M of the base 2 via intermediate films 4, and a surface layer film 8 formed on each of the optical multilayer films 6, namely, an opposite side of the base 2. In other words, the surface layer film 8 is formed on an air side of each optical multilayer film 6.

The intermediate films 4 have the same structure, the optical multilayer films 6 have the same structure, and the surface layer films 8 have the same structure, as viewed from the base 2.

The base 2 may have a shape such as a block-like shape other than the plate-like shape. Each film-formation surface M may be a flat surface or a curved surface, and one each film-formation surface M may have a shape different from that of the other film-formation surface M. At least one of the intermediate films 4 and the surface layer films 8 may be omitted. Furthermore, at least any one of the intermediate films 4, the optical multilayer films 6, and the surface layer films 8 may have a different structure for each film-formation surface M as viewed from the base 2. Moreover, at least any one of the intermediate film 4, the optical multilayer film 6, and the surface layer film 8 may be formed only on one surface of the base 2.

As a material of the base 2, plastic is used, and thermosetting resin is preferably used. Examples of the material of the base 2 include polyurethane resin, thiourethane resin, episulfide resin, polycarbonate resin, polyester resin, acrylic resin, polyether sulfone resin, poly(4-methylpentene-1) resin, diethylene glycol bis(allyl carbonate) resin, and a combination thereof. As a preferable material of the base 2 which has a high refractive index, for example, polyurethane resin obtained by addition-polymerization of a polyisocyanate compound with at least one of polythiol and sulfur-containing polyol may be used. Moreover, as a preferable material of the base 2 which has a high refractive index, episulfide resin obtained by addition-polymerization of an episulfide group with at least one of polythiol and sulfur-containing polyol may be used.

The base 2 preferably has an ultraviolet absorber added thereto.

Each intermediate film 4 is a film disposed between the base 2 and the optical multilayer film 6, and is, for example, a hard coating film. At least one of the intermediate films 4 may be a film other than a hard coating film, instead of the hard coating film, or a film other than a hard coating film may be additionally disposed on at least one of the base 2 side and the air side of the hard coating film.

The hard coating film is preferably formed by uniformly applying a hard coating solution on the surface of the base 2.

As a material of the hard coating film, an organosiloxane-based resin containing inorganic oxide particles may be preferably used. In this case, the hard coating solution is preferably prepared by mixing a solute including an organosiloxane-based resin and an inorganic oxide particle sol as main components, in water or an alcohol-based solvent. The organosiloxane-based resin is preferably obtained by hydrolyzing and condensing alkoxysilane. Specific examples of the organosiloxane-based resin include γ-glycidoxypropyltrimethoxysilane, γ-glycidoxypropyltriethoxysilane, methyl trimethoxysilane, ethyl silicate, and a combination thereof. The hydrolysis condensates of these alkoxysilanes are manufactured by hydrolyzing the alkoxysilane compounds or combinations thereof by an acidic aqueous solution such as hydrochloric acid.

Meanwhile, specific examples of a material of the inorganic oxide particles include a sol of each of zinc oxide, silicon dioxide (silica particulates), aluminium oxide, titanium oxide (titania particulates), zirconium oxide (zirconia particulates), tin oxide, beryllium oxide, antimony oxide, tungsten oxide, and cerium oxide, and mixed crystals of two or more of the sols. The diameter of the inorganic oxide particle is preferably not less than 1 nm and not greater than 100 nm, and more preferably not less than 1 nm and not greater than 50 nm from the viewpoint of assuring transparency of the hard coating film. A concentration of the inorganic oxide particles is preferably not less than 40 wt % and not greater than 60 wt % with respect to all the components in the hard coating film, from the viewpoint of assuring an appropriate level of at least one of hardness and toughness of the hard coating film. In addition, the hard coating solution may have, for example, at least one of an acetylacetone metal salt and an ethylenediaminetetraacetic acid metal salt added thereto as a curing catalyst. Furthermore, the hard coating solution may have a surfactant, a colorant, a solvent, or the like added thereto according to, for example, at least one of necessity for assuring adherence to the base 2 and necessity for facilitating formation.

A physical film thickness of the hard coating film is preferably not less than 0.5 μm and not greater than 4.0 μm, and more preferably not less than 1.0 μm and not greater than 3.0 μm. The lower limit in the film thickness range is determined since it is difficult to obtain a sufficient hardness if the film thickness is less than the lower limit. Meanwhile, the upper limit is determined since a possibility of causing a problem with physical properties such as generation of crack or fragility is significantly increased if the film thickness is greater than the upper limit.

Furthermore, as the intermediate film 4, a primer film may be additionally disposed between the hard coating film and the surface of the base 2 from the viewpoint of enhancing adherence of the hard coating film. Examples of a material of the primer film include polyurethane-based resin, acrylic resin, methacrylic resin, organosilicon-based resin, and a combination thereof. The primer film is preferably formed by uniformly applying a primer solution to the surface of the base 2. The primer solution is preferably a solution in which the above-described resin material and inorganic oxide particles are mixed in water or an alcohol-based solvent.

Each optical multilayer film 6 of the plastic optical product 1 is formed on the intermediate film 4. In a case where the intermediate film 4 is omitted, the optical multilayer film 6 is formed on each film-formation surface M of the base 2.

Each optical multilayer film 6 is formed so as to exhibit an optical function, and is, for example, an antireflection film, a mirror film, a half mirror film, an ND filter, or a band pass filter. The optical multilayer films 6 may have different functions from each other.

Each optical multilayer film 6 is formed by, for example, vacuum deposition or sputtering. The methods for manufacturing of each the optical multilayer films 6 are preferably the same from the viewpoint of assuring ease of manufacturing. The methods for manufacturing of each the optical multilayer films 6 may be different from each other.

Each optical multilayer film 6 is formed by alternately stacking low refractive index layers formed of a low refractive index material that is a metal oxide, and high refractive index layers formed of a high refractive index material that is a metal oxide.

In the plastic optical product 1, each optical multilayer film 6 is structured to have eight layers in total. Furthermore, in each optical multilayer film 6, when the layer closest to the base 2 side, namely, the layer closest to the base 2 is a first layer L1, odd layers are high refractive index layers and even layers are low refractive index layers.

The low refractive index material is silicon oxide ($SiO_2$) Therefore, the even layers of each optical multilayer film 6 are each an $SiO_2$ layer 10. The low refractive index material may be calcium fluoride ($CaF_2$), magnesium fluoride ($MgF_2$), or a mixture which contains two or more of them and $SiO_2$.

The high refractive index material is zirconium oxide ($ZrO_2$). Therefore, the odd layers of each optical multilayer film 6 are each a $ZrO_2$ layer 12. The high refractive index material may be titanium oxide ($TiO_2$), tantalum oxide ($Ta_2O_5$), niobium oxide ($Nb_2O_5$), hafnium oxide ($HfO_2$), selenium oxide ($CeO_2$), aluminium oxide ($Al_2O_3$), yttrium oxide ($YO_2$), or a mixture which contains two or more of them and $ZrO_2$.

In each optical multilayer film 6, one kind of the high refractive index material and one kind of the low refractive index material are used, so that the film designing is facilitated and cost for forming the films is low.

The various layers in each optical multilayer film 6 have the following various characteristics as appropriate.

That is, the $SiO_2$ layer 10 as a fourth layer L4 counting from the base 2 (the same counting manner is applies to the following description) in each optical multilayer film 6 has a physical film thickness of not less than 200 nm and not greater than 245 nm such that reflected light is made inconspicuous.

The $ZrO_2$ layer 12 as a third layer L3 has a physical film thickness of not less than 11 nm and not greater than 20 nm such that reflected light is made inconspicuous.

Furthermore, the $ZrO_2$ layer 12 as the first layer L1 has a physical film thickness of not less than 5 nm and not greater than 12 nm. In a case where the physical film thickness is less than 5 nm, the physical film thickness is excessively small, and it is difficult to assure accuracy of the film thickness. In a case where the physical film thickness is greater than 12 nm, film stress, namely, tensile stress of the first layer L1 is high and excessively high tension is caused, and possibility of causing generation of crack after formation of the film becomes relatively high.

In addition, the total of physical film thicknesses of the $ZrO_2$ layer 12 as the first layer L1 to the $SiO_2$ layer 10 as a fourth layer L4 is not less than 270 nm and not greater than 330 nm such that reflected light is made inconspicuous.

The physical film thickness, namely, the total of the physical film thicknesses of the $ZrO_2$ layer 12 as the first layer L1 to the $SiO_2$ layer 10 as an eighth layer L8 of the optical multilayer film 6 is not less than 480 nm and not greater than 530 nm, and the total of the physical film thicknesses, namely, the total of the physical film thicknesses of the $SiO_2$ layers 10 as the second layer L2, the fourth layer L4, the sixth layer L6, and the eighth layer L8 of the $SiO_2$ layers 10 is not less than 350 nm and not greater than 440 nm such that reflected light is made inconspicuous.

In a case where, regarding each film-formation surface M on which the optical multilayer film 6 is directly or indirectly formed, luminous reflectance on one surface is not greater than 0.8% with a D65 light source and a viewing angle of 2°, the plastic optical product 1 in which unconventionally low luminous reflectance makes reflected light extremely inconspicuous, is provided.

The color of the reflected light is preferably white (achromatic color) or bluish white, and particularly preferably white (achromatic color) from the viewpoint of making the reflected light more inconspicuous. The color of the reflected light can be qualitatively obtained as xy coordinates (x, y) in an xy color system. The xy coordinates (x, y) are represented in a CIE chromaticity diagram.

Each surface layer film 8 is a film disposed closer to the air side than the optical multilayer film 6 is. The surface layer film 8 is, for example, an antifouling film such as water repellent film, oil repellent film. In this case, an antifouling function is further imparted to the plastic optical product 1. At least one of the surface layer film 8 may be a film other than an antifouling film instead of the antifouling film, or a film such as a scratch-resistant film other than an antifouling film may be additionally disposed on at least one of the base 2 side and the air side of the antifouling film.

The antifouling film is obtained by, for example, polycondensation of an organosilicon compound. Through the polycondensation, the film can have an increased thickness and can be made dense in film coating, adherence to the optical multilayer film 6 and the surface hardness are enhanced, oil repellency in addition to water repellency is exhibited, and a coating film having excellent contamination wiping properties can be easily obtained.

The antifouling film is formed by, for example, publicly known vapor deposition or ion sputtering.

Before polycondensation, the organosilicon compound is preferably a compound having a silicon-containing functional group represented by $—SiR_yX_{3-y}$. R represents a monovalent organic group, X represents a hydrolyzable group, and y represents an integer from 0 to 2. Further, X represents, for example, an alkoxy group such as $—OCH_3$ and $—OCH_2CH_3$, an acyloxy group such as $—OCOCH_3$, a ketoxime group such as $—ON{=}CR_aR_b$, a halogen group such as $—Cl$ and $—Br$, or an amino group such as $—NR_cR_d$. $R_a$, $R_b$, $R_c$ and $R_d$ each represent a monovalent organic group.

As such an organosilicon compound, a fluorine-containing organosilicon compound is preferable. A fluorine-containing organosilicon compound comprehensively has excellent water/oil repellency, electrical insulation properties, demoldability, solvent resistance, lubricity, heat resistance, and defoaming properties. Particularly, a relatively large organosilicon compound having a perfluoroalkyl group or a perfluoropolyether group in a molecule and having a molecular weight of about 1000 to 50000 has excellent antifouling properties.

By using the above-described plastic optical product 1 as a plastic spectacle lens, a spectacle that makes reflected light inconspicuous and has excellent outer appearance is produced.

Next, Examples 1 to 8 of the present invention and Comparative examples 1 to 4 that do not belong to the present invention will be described with appropriate reference to the drawings. The present invention is not limited to the following examples. According to the interpretation of the present invention, the examples may be construed as the comparative examples or the comparative examples may be construed as the examples.

In the examples and the comparative examples, the bases 2 were each made of thermosetting resin for spectacles, and had a round shape having a standard size as a plastic spectacle lens.

The bases 2 were the same among the examples and the comparative examples, and were each a spherical lens having the lens center thickness of 1.9 mm and the power of S-0.00 and were made of thiourethane resin in which the refractive index was 1.60. The base 2 was not subjected to dyeing or the like, and the base 2 itself was colorless and transparent.

In the examples and the comparative examples, hard coating films were formed as the intermediate films 4 on both surfaces by applying a hard coating solution.

The hard coating solution was applied to the base 2 and heated, whereby the hard coating film was formed so as to be in contact with the base 2 as follows.

That is, 206 g of methanol, 300 g of methanol-dispersed titania-based sol (produced by JGC Catalysts and Chemicals Ltd., solid content of 30%), 60 g of γ-glycidoxypropylt-rimethoxysilane, 30 g of γ-glycidoxypropylmethyldiethox-ysilane, and 60 g of tetraethoxysilane were firstly dropped into a reaction vessel, and 0.01N (normality) of hydrochloric acid aqueous solution was dropped into the mixture, and the obtained mixture was stirred and hydrolyzed.

Subsequently, 0.5 g of a flow regulating agent and 1.0 g of a catalyst were added, and the obtained mixture was stirred at room temperature for three hours, thereby forming the hard coating solution.

The hard coating solution was applied to both surfaces of the base 2, and heated at 120° C. for 1.5 hours and hardened, thereby forming the hard coating film having a film thick-ness of 2.5 μm.

Furthermore, in each of Examples 1 to 8 and Comparative examples 1 to 4, the optical multilayer films 6 and the surface layer films 8 were formed on the hard coating layers on both surfaces so as to form the same structure on both the surfaces.

The optical multilayer film 6 was an antireflection film and had eight layers in total, and was firstly formed on a convex surface side, namely, front surface side of the optical product, and was subsequently formed on a concave surface side, namely, rear surface side of the optical product, by vacuum deposition.

The $SiO_2$ layer 10 to be disposed at an even layer in the optical multilayer film 6 was formed in a vacuum chamber by normal deposition by using $SiO_2$ available from Canon Optron, Inc. as a vapor deposition source.

The $ZrO_2$ layer 12 to be disposed at an odd layer in the optical multilayer film 6 was formed in a vacuum chamber by ion assisted deposition by using $ZrO_2$ available from Canon Optron, Inc. as a vapor deposition source. Ion-assist gas in the ion-assist was mixed gas of oxygen ($O_2$) gas and argon (Ar) gas as rare gas, and output in the ion-assist was performed at an acceleration voltage of 500 V and an acceleration current of 300 mA. The refractive index of each $ZrO_2$ layer 12 was greater than the refractive index of $SiO_2$, and was able to be adjusted by several factors, for example, a film forming rate, a vacuum chamber temperature as a film formation temperature, the degree of vacuum, presence or absence of ion-assist, an acceleration voltage value in the ion-assist, and a kind of gas.

The surface layer film 8 was a water/oil repellent film as an antifouling film, and was formed on the optical multilayer film 6 at a thickness of 5.00 nm by using OF-SR available from Canon Optron, Inc.

In Examples 1 to 8 and Comparative examples 1 to 4, the first layer L1 to the eighth layer L8 of the optical multilayer film 6, and the surface layer film 8 were formed as indicated in the upper portion of each of the following Table 1 to Table 3. Each refractive index was a refractive index at a wave-length of 500 nm in each layer. According to Examples 1 to 8 and Comparative examples 1 to 4, the refractive index among all the $SiO_2$ layers 10 was 1.469, which is same value. The refractive index among all the $ZrO_2$ layers 12 was 2.106, which is same value. The refractive index among all the surface layer film 8 was 1.350, which is same value.

TABLE 1

| | | Refractive index | Physical film thickness [nm] | | | |
|---|---|---|---|---|---|---|
| | Material | at 500 nm | Example 1 | Example 2 | Example 3 | Example 4 |
| First layer L1 | $ZrO_2$ | 2.106 | 8.00 | 5.00 | 7.50 | 6.00 |
| Second layer L2 | $SiO_2$ | 1.469 | 54.00 | 50.00 | 60.00 | 59.50 |
| Third layer L3 | $ZrO_2$ | 2.106 | 15.00 | 12.50 | 13.50 | 11.00 |
| Fourth layer L4 | $SiO_2$ | 1.469 | 222.00 | 221.00 | 227.50 | 240.00 |
| Fifth layer L5 | $ZrO_2$ | 2.106 | 36.00 | 35.00 | 34.50 | 29.00 |
| Sixth layer L6 | $SiO_2$ | 1.469 | 16.00 | 17.00 | 17.00 | 32.00 |
| Seventh layer L7 | $ZrO_2$ | 2.106 | 65.00 | 65.00 | 66.00 | 46.00 |
| Eighth layer L8 | $SiO_2$ | 1.469 | 93.00 | 94.00 | 93.00 | 101.50 |
| Water/oil repellent agent | | 1.350 | 5.00 | 5.00 | 5.00 | 5.00 |
| Physical film thickness [nm] of optical multilayer film 6 | | | 509.00 | 499.50 | 519.00 | 525.00 |
| Total of physical film thicknesses [nm] of all the $SiO_2$ layers 10 | | | 385.00 | 382.00 | 397.50 | 433.00 |
| Total of physical film thicknesses [nm] of first layer L1 to fourth layer L4 | | | 299.00 | 288.50 | 308.50 | 316.50 |
| Chromaticity | | x | 0.24 | 0.25 | 0.24 | 0.23 |
| | | y | 0.27 | 0.28 | 0.26 | 0.26 |
| Luminous reflectance (%) | D65 light source, viewing angle of 2° | | 0.52 | 0.54 | 0.50 | 0.57 |

TABLE 2

| | | Refractive index | Physical film thickness [nm] | | | |
|---|---|---|---|---|---|---|
| | Material | at 500 nm | Example 5 | Example 6 | Example 7 | Example 8 |
| First layer L1 | $ZrO_2$ | 2.106 | 12.00 | 8.50 | 11.50 | 6.00 |
| Second layer L2 | $SiO_2$ | 1.469 | 53.50 | 44.00 | 53.50 | 59.50 |
| Third layer L3 | $ZrO_2$ | 2.106 | 20.00 | 15.00 | 19.50 | 11.00 |
| Fourth layer L4 | $SiO_2$ | 1.469 | 220.00 | 205.00 | 219.00 | 245.00 |

TABLE 2-continued

| | | Refractive index | Physical film thickness [nm] | | | |
| | Material | at 500 nm | Example 5 | Example 6 | Example 7 | Example 8 |
|---|---|---|---|---|---|---|
| Fifth layer L5 | $ZrO_2$ | 2.106 | 40.50 | 36.00 | 42.00 | 29.00 |
| Sixth layer L6 | $SiO_2$ | 1.469 | 12.00 | 12.50 | 12.50 | 32.00 |
| Seventh layer L7 | $ZrO_2$ | 2.106 | 67.50 | 67.00 | 63.50 | 46.00 |
| Eighth layer L8 | $SiO_2$ | 1.469 | 89.50 | 92.00 | 89.00 | 101.50 |
| Water/oil repellent agent | | 1.350 | 5.00 | 5.00 | 5.00 | 5.00 |
| Physical film thickness [nm] of optical multilayer film 6 | | | 515.00 | 480.00 | 510.50 | 530.00 |
| Total of physical film thicknesses [nm] of all the $SiO_2$ layers 10 | | | 375.00 | 353.50 | 374.00 | 438.00 |
| Total of physical film thicknesses [nm] of first layer L1 to fourth layer L4 | | | 305.50 | 272.50 | 303.50 | 321.50 |
| Chromaticity | | x | 0.26 | 0.24 | 0.26 | 0.22 |
| | | y | 0.26 | 0.26 | 0.26 | 0.26 |
| Luminous reflectance (%) | | D65 light source, viewing angle of 2° | 0.60 | 0.55 | 0.66 | 0.57 |

TABLE 3

| | | Refractive index | Physical film thickness [nm] | | | |
| | Material | at 500 nm | Comparative example 1 | Comparative example 2 | Comparative example 3 | Comparative example 4 |
|---|---|---|---|---|---|---|
| First layer L1 | $ZrO_2$ | 2.106 | 6.00 | 15.00 | 6.00 | 11.50 |
| Second layer L2 | $SiO_2$ | 1.469 | 64.00 | 50.50 | 28.00 | 43.00 |
| Third layer L3 | $ZrO_2$ | 2.106 | 11.50 | 22.00 | 9.00 | 10.00 |
| Fourth layer L4 | $SiO_2$ | 1.469 | 250.00 | 218.00 | 202.00 | 190.00 |
| Fifth layer L5 | $ZrO_2$ | 2.106 | 25.00 | 37.50 | 34.00 | 34.00 |
| Sixth layer L6 | $SiO_2$ | 1.469 | 43.00 | 22.50 | 23.00 | 26.50 |
| Seventh layer L7 | $ZrO_2$ | 2.106 | 37.50 | 51.00 | 52.00 | 48.50 |
| Eighth layer L8 | $SiO_2$ | 1.469 | 105.00 | 96.00 | 92.00 | 94.00 |
| Water/oil repellent agent | | 1.350 | 5.00 | 5.00 | 5.00 | 5.00 |
| Physical film thickness [nm] of optical multilayer film 6 | | | 542.00 | 512.50 | 446.00 | 457.50 |
| Total of physical film thicknesses [nm] of all the $SiO_2$ layers 10 | | | 462.00 | 387.00 | 345.00 | 353.50 |
| Total of physical film thicknesses [nm] of first layer L1 to fourth layer L4 | | | 331.50 | 305.50 | 245.00 | 254.50 |
| Chromaticity | | x | 0.30 | 0.27 | 0.30 | 0.34 |
| | | y | 0.28 | 0.25 | 0.26 | 0.34 |
| Luminous reflectance (%) | | D65 light source, viewing angle of 2° | 0.71 | 0.64 | 0.58 | 0.76 |

Figure 2:
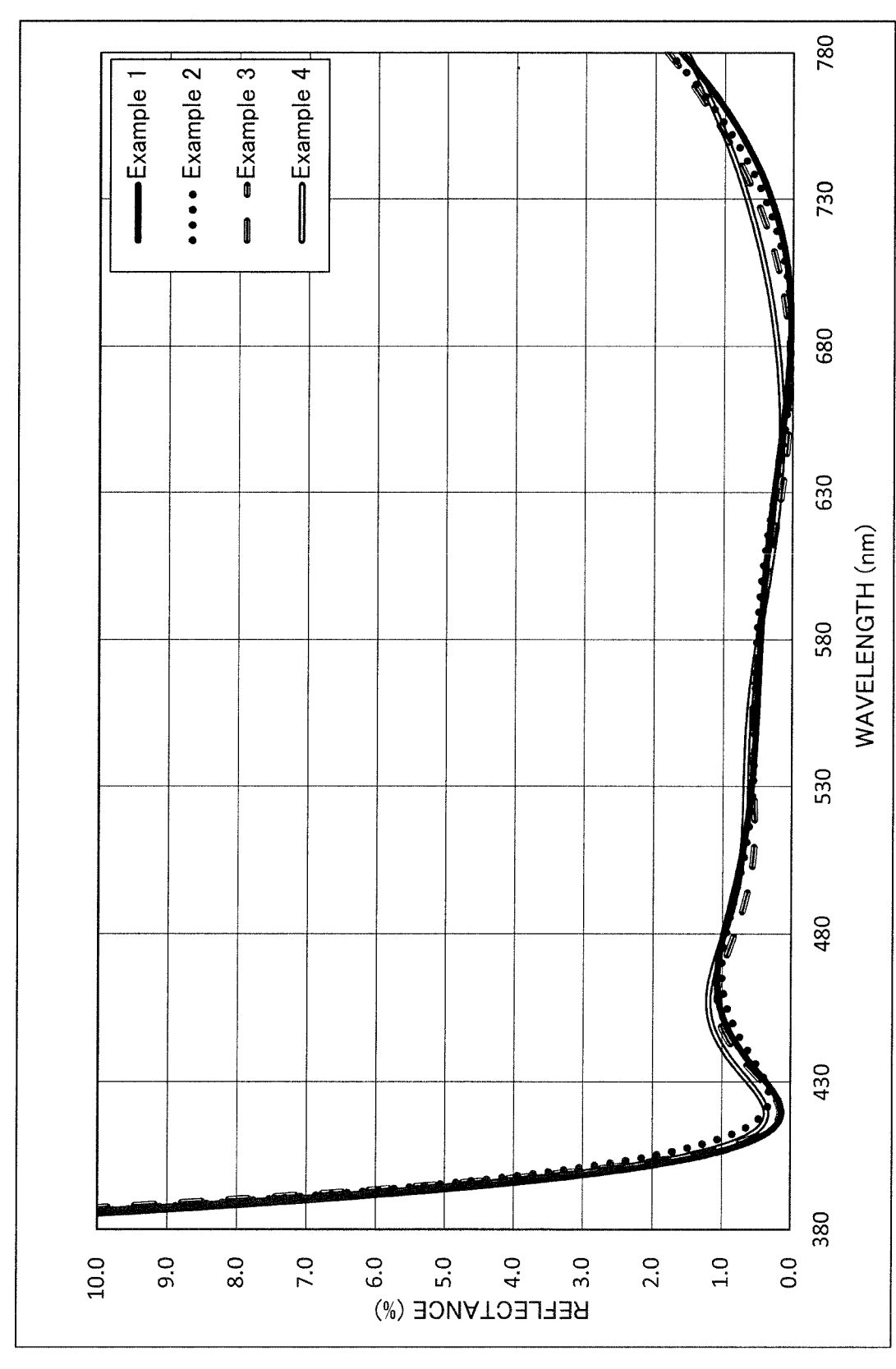
FIG. 2 shows a graph representing a spectral reflectance distribution in a visible range and an adjacent range, in Examples 1 to 4.
Figure 3:
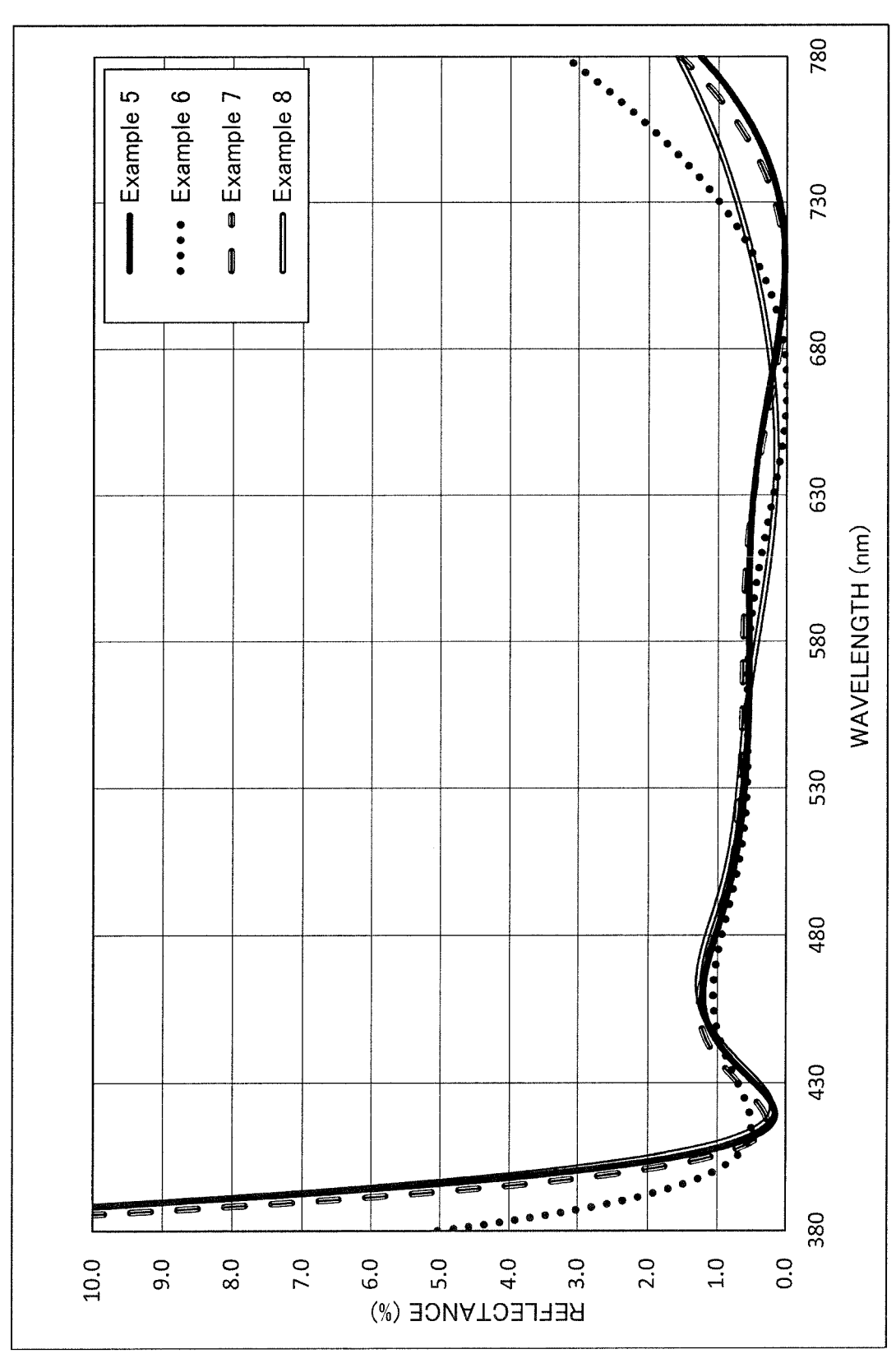
FIG. 3 shows a graph representing a spectral reflectance distribution in a visible range and an adjacent range, in Examples 5 to 8.
Figure 4:
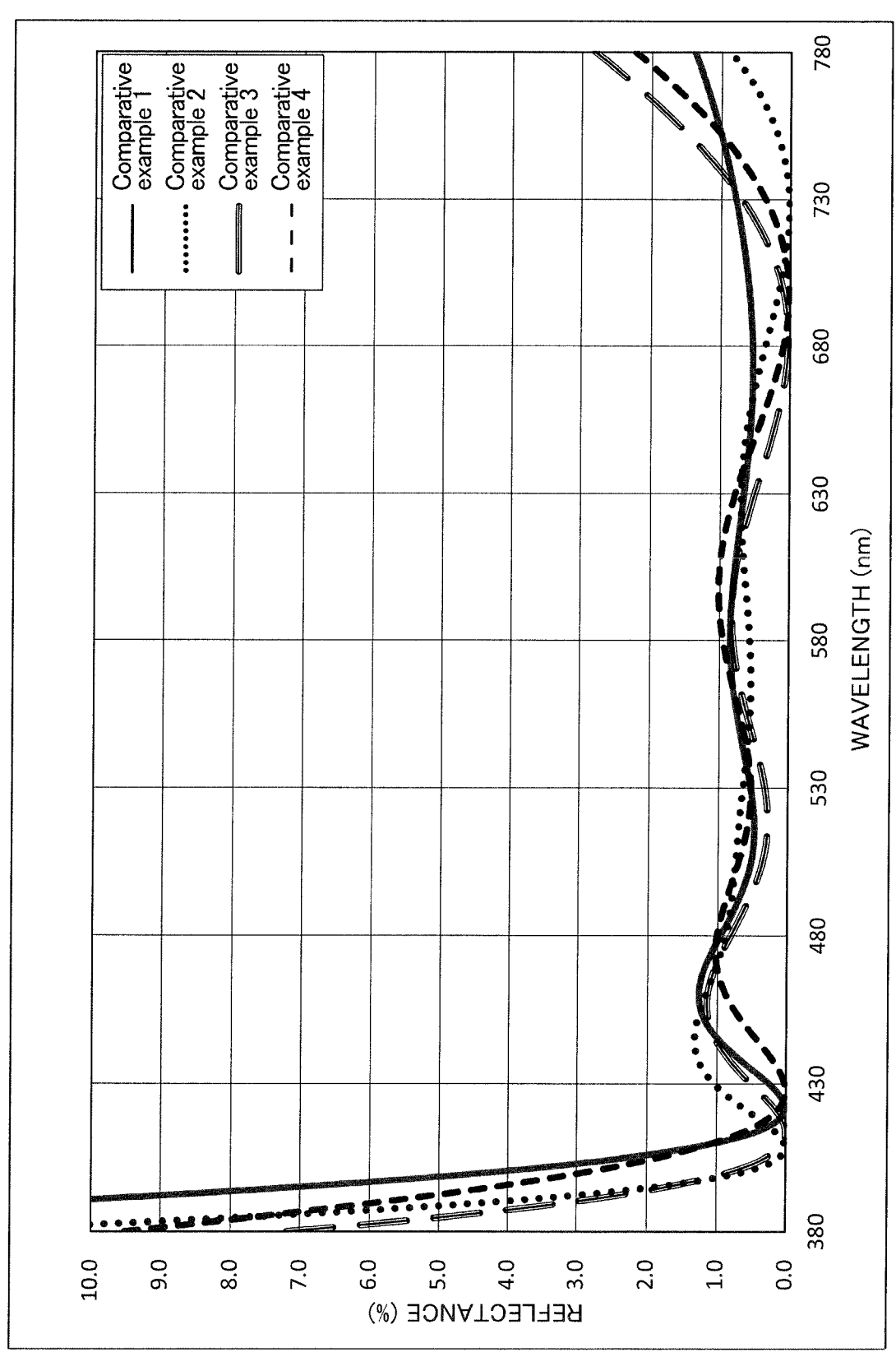
FIG. 4 shows a graph representing a spectral reflectance distribution in a visible range and an adjacent range, in Comparative examples 1 to 4.

For Examples 1 to 8 and Comparative examples 1 to 4, as shown in FIG. 2 to FIG. 4, a spectral reflectance distribution in a visible range and an adjacent range were measured. In the description, the visible range is a range of wavelengths of not less than 400 nm and not greater than 780 nm, and the adjacent range is a range of wavelengths of not less than 380 nm and not greater than 400 nm. Further, as shown in the lower side of the lower portion in each of Table 1 to Table 3, luminous reflectance at the convex surface side with a D65 light source and a viewing angle of 2° were measured.

Figure 5:
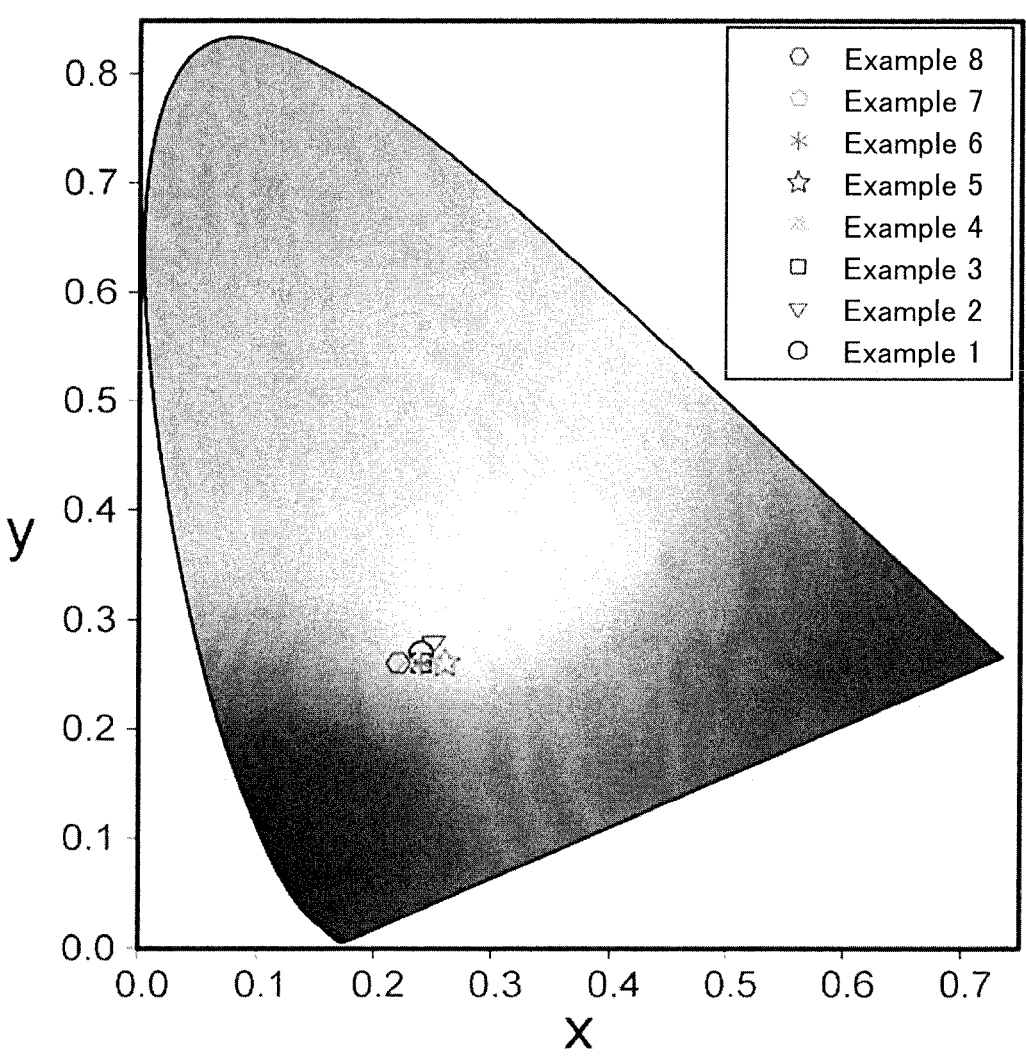
FIG. 5 is a CIE chromaticity diagram in which chromaticity is plotted, for Examples 1 to 8.
Figure 6:
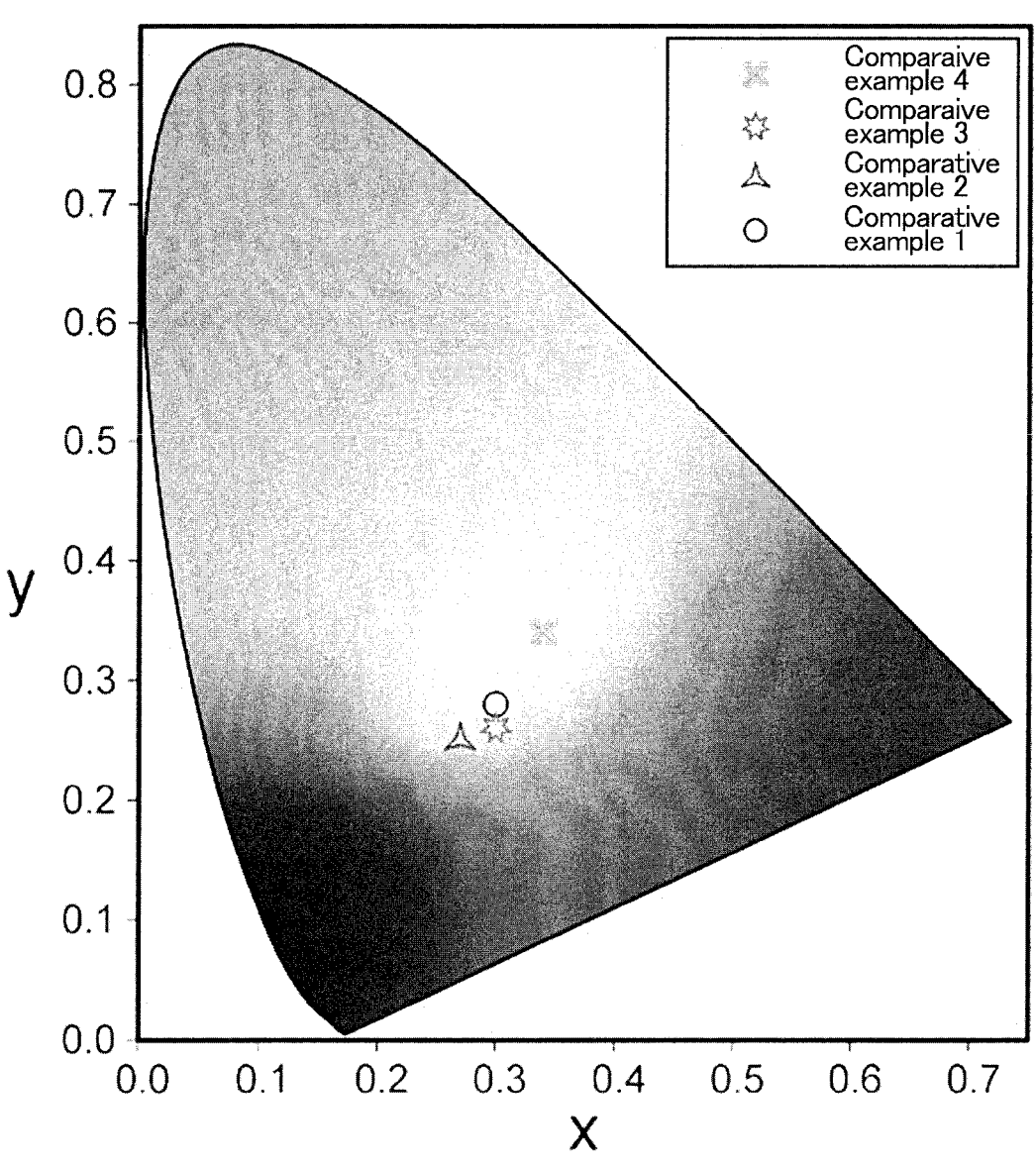
FIG. 6 is a CIE chromaticity diagram in which chromaticity is plotted, for Comparative examples 1 to 4.

As shown in the upper side of the low portion in each of Table 1 to Table 3, for Examples 1 to 8 and Comparative examples 1 to 4, chromaticity, namely, x and y in an xy color system with a D65 light source and viewing angle of 2° was measured. FIG. 5 and FIG. 6 are each a CIE chromaticity diagram in which x and y in Examples 1 to 8 and Comparative examples 1 to 4 are plotted.

In Comparative example 1, the physical film thickness of the optical multilayer film 6, namely, the total of the physical film thicknesses of the first layer L1 to the eighth layer L8, hereinafter referred to as LT, was 542.00 nm and was greater than 530 nm, and the total of the physical film thicknesses of the second layer L2, the fourth layer L4, the sixth layer L6, and the eighth layer L8 of the $SiO_2$ layers 10, hereinafter referred to as LS, was 462.00 nm and was greater than 440 nm. The physical film thickness of the $SiO_2$ layer 10 as the fourth layer L4 was 250 nm and was greater than 245 nm. Furthermore, the physical film thickness of the $ZrO_2$ layer 12 as the third layer L3 was 11.50 nm, and was in a range of not less than 11 nm and not greater than 20 nm. Moreover, the physical film thickness of the $ZrO_2$ layer 12 as the first layer L1 was 6.00 nm and was in a range of not less than 5 nm and not greater than 12 nm. In addition, the total of the physical film thicknesses of the $ZrO_2$ layer 12 as the first layer L1 to the $SiO_2$ layer 10 as the fourth layer L4, hereinafter referred to as LL, was 331.50 nm and was greater than 330 nm. In Comparative example 1, the luminous reflectance was 0.71% and was not greater than 0.8%, and was thus very good. However, in Comparative example 1, the chromaticity (x, y)=(0.30, 0.28) was indicated, and reflected light generated by slight reflection had a pink color, and was conspicuous in chromaticity In Comparative example 1, the spectral reflectance distribution had a WW shape having two local maximum values at around 455 nm and around 585 nm.

In Comparative example 2, LT=512.50 nm was satisfied and LT was in a range of not less than 480 nm and not greater than 530 nm, and LS=387.00 nm was satisfied and LS was in a range of not less than 350 nm and not greater than 440 nm. The physical film thickness of the fourth layer L4 was 218.00 nm, and was in a range of not less than 200 nm and not greater than 245 nm. Furthermore, the physical film thickness of the third layer L3 was 22.00 nm, and was greater than 20 nm. Moreover, the physical film thickness of the first layer L1 was 15.00 nm, and was greater than 12 nm. In addition, LL=305.50 nm was satisfied, and LL was in a range of not less than 270 nm and not greater than 330 nm. In Comparative example 2, the luminous reflectance was 0.64% and was not greater than 0.8%, and was thus very good. However, in Comparative example 2, the chromaticity (x, y)=(0.27, 0.25) was indicated, and reflected light generated by slight reflection had a purple color and was conspicuous in chromaticity. In Comparative example 2, the spectral reflectance distribution had a WW shape having two local maximum values at around 440 nm and around 630 nm.

In Comparative example 3, LT=446.00 nm was satisfied and LT was less than 480 nm, and LS=345.00 nm was satisfied and LS was less than 350 nm. The physical film thickness of the fourth layer L4 was 202.00 nm, and was in a range of not less than 200 nm and not greater than 245 nm. Furthermore, the physical film thickness of the third layer L3 was 9.00 nm, and was less than 11 nm. Moreover, the physical film thickness of the first layer L1 was 6.00 nm, and was in a range of not less than 5 nm and not greater than 12 nm. In addition, LL=245.00 nm was satisfied, and LL was less than 270 nm. In Comparative example 3, the luminous reflectance was 0.58% and was not greater than 0.8%, and was thus very good. However, in Comparative example 3, the chromaticity (x, y)=(0.30, 0.26) was indicated, and reflected light generated by slight reflection had a pink color and was conspicuous in chromaticity. In Comparative example 3, the spectral reflectance distribution had a WW shape having two local maximum values at around 450 nm and around 590 nm.

In Comparative example 4, LT-457.50 nm was satisfied and LT was less than 480 nm, and LS=353.50 nm was satisfied and LS was in a range of not less than 350 nm and not greater than 440 nm. The physical film thickness of the fourth layer L4 was 190.00 nm, and was less than 200 nm. Furthermore, the physical film thickness of the third layer L3 was 10.00 nm, and was less than 11 nm. Moreover, the physical film thickness of the first layer L1 was 11.50 nm, and was in a range of not less than 5 nm and not greater than 12 nm. In addition, LL=254.50 nm was satisfied, and LL was less than 270 nm. In Comparative example 4, the luminous reflectance was 0.76% and was not greater than 0.8%, and was thus very good. However, in Comparative example 4, the chromaticity (x, y)=(0.34, 0.34) was indicated, and reflected light generated by slight reflection had a yellow color, and was conspicuous in chromaticity. In Comparative example 4, the spectral reflectance distribution had a WW shape having two local maximum values at around 475 nm and around 600 nm.

Meanwhile, in each of Examples 1 to 8, LT was in a range of not less than 480 nm and not greater than 530 nm, and LS was in a range of not less than 350 nm and not greater than 440 nm. The physical film thickness of the fourth layer L4 was in a range of not less than 200 nm and not greater than 245 nm. Furthermore, the physical film thickness of the third layer L3 was in a range of not less than 11 nm and not greater than 20 nm. Moreover, the physical film thickness of the first layer L1 was in a range of not less than 5 nm and not greater than 12 nm. Therefore, in Examples 1 to 8, the optical multilayer film 6 had antireflection performance, and each luminous reflectance was not greater than 0.8% and was at an extremely excellent level. Each chromaticity of reflected light generated by slight reflection indicated a bluish white color, and the reflected light was viewed by a person so as to have a very light blue, and was inconspicuous. Each reflectance distribution had a W shape having the local maximum value in a range of not less than 450 nm and not greater than 475 nm.

Furthermore, in each of Examples 1 to 8, the physical film thickness of the first layer L1 was in a range of not less than 5 nm and not greater than 12 nm. Therefore, the first layer L1 was easily formed, adherence to the hard coating film was sufficiently assured, and, furthermore, reflected light was inconspicuous.

Examples 1 to 8 are each a plastic spectacle lens in which the optical multilayer films 6 are formed, via the intermediate films 4 that are the hard coating films, on both surfaces of the base 2 made of plastic. In each optical multilayer film 6, the $SiO_2$ layers 10 made of $SiO_2$ and the $ZrO_2$ layers 12 made of $ZrO_2$ alternate such that the total number of the $SiO_2$ layers 10 and the $ZrO_2$ layers 12 is eight and the first layer L1 closest to the base 2 is the $ZrO_2$ layer 12. In Examples 1 to 8, the physical film thickness of the optical multilayer film 6 is not less than 480 nm and not greater than 530 nm, the total of the physical film thicknesses of all the $SiO_2$ layers 10 is not less than 350 nm and not greater than 440 nm, and the physical film thickness of the $ZrO_2$ layer 12 that is the first layer L1 closest to the base 2 is not less than 5 nm and not greater than 12 nm. Therefore, reflected light becomes inconspicuous, and the optical multilayer film 6 is more easily formed, and, further, assuredly has excellent adherence to the intermediate film 4.

Furthermore, in Examples 1 to 8, the physical film thickness of the $ZrO_2$ layer 12 disposed at the third layer L3 counting from the base 2 is not less than 11 nm and not greater than 20 nm. Therefore, reflected light becomes more inconspicuous.

Moreover, in Examples 1 to 8, the physical film thickness of the $SiO_2$ layer 10 disposed at the fourth layer L4 counting from the base 2 is not less than 200 nm and not greater than 245 nm. Therefore, reflected light becomes more inconspicuous.

In addition, the total of the physical film thicknesses of the $ZrO_2$ layer 12 as the first layer L1 to the $SiO_2$ layer 10 as the fourth layer L4 is not less than 270 nm and not greater than 330 nm. Therefore, reflected light further becomes more inconspicuous.

The intermediate film 4 is a hard coating film. Therefore, the hardness of the plastic optical product 1 is preferable, and, consequently, durability thereof is preferable.

In Examples 1 to 8, the luminous reflectance at the convex surface at which the optical multilayer film 6 is formed, is not greater than 0.8%. Therefore, the luminous reflectance is extremely low, and the reflected light further becomes more inconspicuous.

Furthermore, in Examples 1 to 8, reflected light at the surface at which the optical multilayer film 6 is formed has a white color or a bluish white color. Therefore, the reflected light further becomes more inconspicuous.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A plastic optical product comprising an optical multilayer film formed directly or via an intermediate film on at least one surface of a plastic base, wherein in the optical multilayer film, $SiO_2$ layers made of $SiO_2$ and $ZrO_2$ layers made of $ZrO_2$ alternate such that a total number of the $SiO_2$ layers and the $ZrO_2$ layers is eight and a layer closest to the base is the $ZrO_2$ layer, the optical multilayer film has a physical film thickness of not less than 480 nm and not greater than 530 nm, a total of physical film thicknesses of all the $SiO_2$ layers is not less than 350 nm and not greater than 440 nm, and the $ZrO_2$ layer that is a layer closest to the base has a physical film thickness of not less than 5 nm and not greater than 12 nm, and wherein reflected light at a surface at which the optical multilayer film is formed has a white color or a bluish white color, and wherein, in an xy color system, an x coordinate of the reflected light satisfies $0.23 \leq x \leq 0.26$, and a y coordinate of the reflected light satisfies $0.26 \leq y \leq 0.28$.

2. The plastic optical product according to claim 1, wherein the $ZrO_2$ layer disposed at a third layer counting from the base has a physical film thickness of not less than 11 nm and not greater than 20 nm.

3. The plastic optical product according to claim 1, wherein the $SiO_2$ layer disposed at a fourth layer counting from the base has a physical film thickness of not less than 200 nm and not greater than 245 nm.

4. The plastic optical product according to claim 1, wherein a total of physical film thicknesses of the $ZrO_2$ layer that is the layer closest to the base, to the $SiO_2$ layer disposed at the fourth layer counting from the base, is not less than 270 nm and not greater than 330 nm.

5. The plastic optical product according to claim 1, wherein the intermediate film is a hard coating film.

6. The plastic optical product according to claim 1, wherein luminous reflectance at a surface at which the optical multilayer film is formed is not greater than 0.8%.

7. A plastic spectacle lens comprising the plastic optical product according to claim 1.

* * * * *